United States Patent [19]

de Lockerente et al.

[11] 4,276,269

[45] Jun. 30, 1981

[54] PROCESS OF HYDROMETALLURGICAL TREATMENT FOR ELIMINATING IMPURITIES FROM A SOLUTION CONTAINING DISSOLVED METALS

[75] Inventors: Serge R. de Lockerente, Alsemberg; Jacques De Laever, Auderghem, both of Belgium

[73] Assignee: Hollux S.A., Belgium

[21] Appl. No.: 87,761

[22] Filed: Oct. 24, 1979

Related U.S. Application Data

[63] Continuation-in-part of Ser. No. 903,612, May 8, 1978, abandoned.

[30] Foreign Application Priority Data

Apr. 28, 1978 [BE] Belgium .............................. 187262
May 9, 1977 [LU] Luxembourg ....................... 77307

[51] Int. Cl.³ ............................................ C22B 19/26
[52] U.S. Cl. ................................. 423/101; 423/109; 423/140; 423/326
[58] Field of Search ............... 423/101, 102, 104, 106, 423/109, 326, 329

[56] References Cited

U.S. PATENT DOCUMENTS

| 1,185,757 | 6/1916 | Araki ..................................... 423/106 |
| 1,751,955 | 3/1930 | Stoewener ............................ 423/339 |
| 2,599,816 | 6/1952 | Ellsworth ............................. 423/102 |

FOREIGN PATENT DOCUMENTS

876034  7/1971  Canada.

OTHER PUBLICATIONS

Gordon et al., "Improved Leaching Techniques in the Electrolytic Zinc Industry," *Metallurgical Transactions B*, Mar. 1975, pp. 43–53.

*Primary Examiner*—Brian E. Hearn
*Attorney, Agent, or Firm*—Scully, Scott, Murphy & Presser

[57] ABSTRACT

In a hydrometallurgical treatment for eliminating one or more metal impurities from a solution containing a metal to be extracted and said metal impurities, a silicate is added to the solution forming in situ dissolved silicic acid and precipitating the metal impurities at a pH of between 1.5 and 4.5 to form a solid silicate residue.

12 Claims, 2 Drawing Figures

PROCESS OF HYDROMETALLURGICAL TREATMENT FOR ELIMINATING IMPURITIES FROM A SOLUTION CONTAINING DISSOLVED METALS

CROSS REFERENCE TO RELATED APPLICATION

This application is a continuation-in-part of copending U.S. patent application Ser. No. 903,612, filed May 8, 1978, now abandoned.

BACKGROUND OF THE INVENTION

1. Field of the Invention

The present invention relates to processes of hydrometallurgical treatment for eliminating metal impurities from a solution containing dissolved metals to be extracted and, more particularly, to such processes for eliminating iron impurities from a zinc sulfate solution.

2. Description of the Prior Art

In hydrometallurgy as currently practiced, there are in general three principal industrial processes for selectivity eliminating iron as a decantable and filterable residue from zinc sulfate solutions resulting from the chemical attack of oxidized zinc ores, more particularly roasted zinc ores. The iron residue is largely made of jarosite, geothite or hematite depending upon the particular process involved. The known processes are, however, subject to the drawback that the iron residues resulting therefrom are generally without any significant commercial or industrial value and the proper disposal of the residues poses serious practical and environmental difficulties. Furthermore, the known processes involve expensive and complex facilities for their realization, when making allowances for the flow rates and retention times involved.

SUMMARY OF THE INVENTION

The invention herein provides a process for eliminating metal impurities, more particularly iron, from a solution of zinc sulfate to be submitted to an electrolysis for extraction of zinc in the metal state. The zinc sulfate solution is usually obtained from the chemical attack of a residue of an oxidized zinc ore with sulfuric acid, more particularly roasted zinc ore obtained from the lixiviation of this ore.

A principal object of the present invention is to provide a relatively simple hydrometallurgical process for eliminating metal impurities being capable of direct use, without any further significant treatment, in various industrial applications or as raw materials for the manufacture of industrial products such as building materials.

In accordance with the invention herein, a process of hydrometallurgical treatment is provided for removing metal impurities from a zinc sulfate solution, said metal impurities being subject to precipitation at a pH between 0.5 and 4.5, which comprises adding to the zinc sulfate solution a silicate capable of forming dissolved silicic acid in situ and simultaneously providing a pH between 1.5 and 4.5 whereby the metal impurities are precipitated in the form of their silicates.

Other details and features of this invention will become apparent from the description such as hereinafter given, by way of non-limitative examples, of several particular embodiments of the invention, with reference to the annexed drawings.

BRIEF DESCRIPTION OF THE DRAWINGS

In these figures, the same references numerals relate to identical or similar elements.

DESCRIPTION OF THE PREFERRED EMBODIMENTS

The process herein is characterized in that to a solution of zinc sulfate containing one or more metal impurities, a silicate, such as an alkaline earth metal silicate or zinc silicate, is added so as to form in situ dissolved silicic acid and to precipitate metal impurities at a pH between 0.5 and 4.5, preferably between 1.5 and 4.5, forming a conveniently filterable and readily washable silicate residue.

When a silicate, preferably a zinc silicate, is employed in the process of this invention, the zinc sulfate solution is first maintained at a pH between 0.5 and 1.5 so as to allow the silicate to be quickly dissolved. Thereafter, an alkaline earth metal silicate, preferably calcium silicate, or limestone and/or lime, is added as necessary to maintain the pH of the solution between 1.5 and 4.5, and to induce precipitation of the impurities, forming a solid silicate residue mainly made up of iron silicate.

In some cases, oxidized zinc ore can also be used to bring the pH to within the range of between 0.5 and 1.5, the formation of silicic acid being then obtained by addition of an alkaline earth metal silicate which precipitates said impurities, forming said solid silicate residue, when the pH is maintained between 1.5 and 4.5; this may be carried out by using a sufficiently basic silicate, limestone and/or a lime addition.

In other cases, it is necessary only to use an alkaline earth metal silicate, preferably calcium silicate, since this and similar silicates remain in solution to a sufficient extent at a pH between 1.5 and 4.5 to allow precipitation of the undesirable metal impurities.

The actual amount of silica dissolved in the zinc sulfate solution of any one time always remains extremely small since as the silicate dissolves therein, it reacts substantially instantaneously with iron ions and with the metal ions of other impurities which may be present, forming a solid silicate residue, when the pH is maintained between 1.5 and 4.5.

The preferred range of pH causing precipitation of metal impurities in the zinc sulfate solution is 3.5 to 4.5. In order to prevent the presence of too large an excess of dissolved silica after said precipitation, it is desirable not to exceed the stoichiometrical amount of added silicate with respect to the metal impurities to be eliminated.

Figure 1:
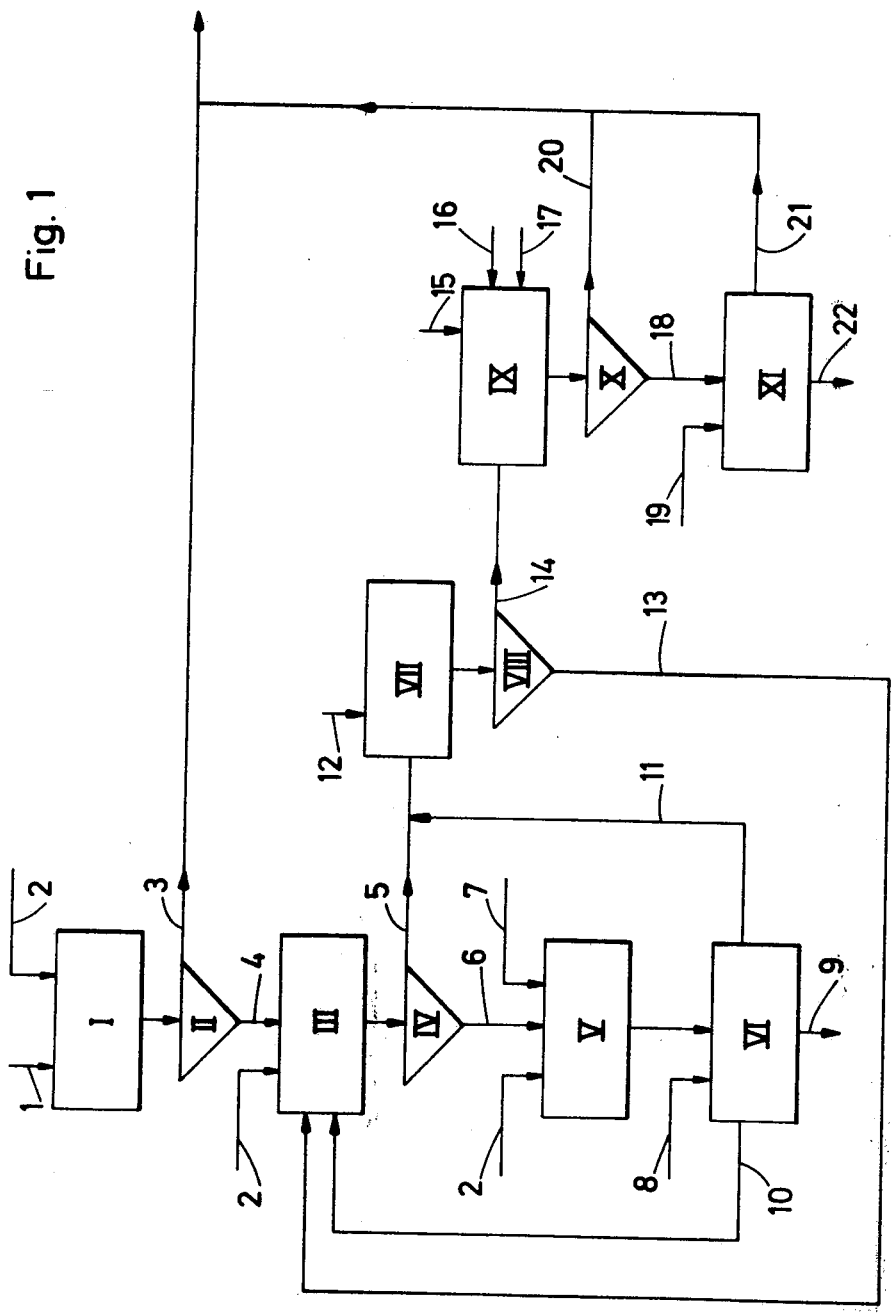
FIG. 1 is a block diagram of a first embodiment of a process according to the invention.

FIG. 1 illustrates the various steps of a particular embodiment of the process according to the invention, such as applied to extraction of zinc from oxidized zinc ore. Ore 1 is subjected to an attack by means of sulfuric acid 2 (commonly referred to as "return acid") mainly coming from the known and conventional electrolysis of zinc sulfate for precipitating zinc metal at the cathode, this electrolysis not being illustrated herein. This attack with sulfuric acid is well known and may be carried out in one or two steps. In the case of a one-step attack, such as illustrated by FIG. 1, an excess of ore is used so as to obtain a neutral medium. In II, one separates by decantation, on the one hand, a solution 3 containing zinc sulfate which, after a purification step (not shown) is sent to the above-mentioned electrolysis, and on the other hand, a residue 4, generally called "neutral residue", having a concentration, for example, of 200 to 400 gr/l of solids, which is subjected to a hot acid attack at a temperature generally between 85° C. and 95° C. by means of more concentrated acid in order to mainly dissolve zinc ferrites. This acid attack of the neutral residue may take place in one or more counter-current steps. FIG. 1 is illustrative of a two-step attack. The latter comprises attack of the neutral residue 4 in III by means of more concentrated acid 10 and a return acid addition 2, separation by decantation in IV of a dissolved iron-loaded solution 5 and submitting thickened portion 6 to a new attack in V, being generally more acid than in the preceding step, by means of return acid 2 and a make-up of fresh concentrated acid 7, for example about 98% acid. The reaction products are then subjected to a filtration in VI. The filtration cake is treated with wash water 8 and a solid residue 9, rich in lead and possibly noble metals which may have been present in ore 1, is obtained. A portion 10 of the filtrate, forming said more concentrated acid, is recycled for further attack of ore in III, while the other portion 11, diluted with wash water 8, at the same time as solution 5, at a resulting acidity of from 5 to 250 gr/l of $H_2SO_4$, advantageously of from 30 to 60 gr/l of $H_2SO_4$, preferably of 30 to 45 gr/l of $H_2SO_4$, is subjected to a neutralization in VII with a fresh amount 12 of oxidized zinc ore until a pH not exceeding 1.5, preferably between 0.5 and 1.5, is obtained. By decantation, a residue 13 is separated in VIII, this residue being optionally conveyed to the neutral residue attack in III for solubilizing zinc ferrites. Dissolved silica in the silicic acid state is formed in IX, according to the invention, in the acid solution made of the overflow 14 coming from the aforementioned decantation, by addition of a sufficiently basic silicate 15, such as calcium silicate, for example as a slag, while maintaining the pH value between 1.5 and 4.5, preferably between 3.5 and 4.5, thus precipitating a silicate residue containing impurities, in particular iron. When carrying out this precipitation in an oxidizing medium, for example, by admitting air or oxygen 16 and/or optionally an oxidizing agent 17, such as $MnO_2$, any $Fe^{++}$ which may be present is also precipitated, after oxidation to $Fe^{+++}$. The duration of the chemical attack in IX is generally about 1 to 4 hours and essentially depends on the presence of $Fe^{++}$ ions. The reaction product formed in IX is subjected to a decantation in X. The thickened portion 18 is then filtered in XI, followed by a treatment with wash water 19. The overflow 20 coming from decantation in X, as well as the filtrate 21 diluted with wash water 19 are combined with solution 3 which, after a final purification known per se, is submitted to electrolysis for zinc extraction. The decantation in X can, in many situations, be eliminated since generally the solids concentration is relatively high. The reaction product formed in X in such cases can then be immediately subjected to filtration in XI. The filtration cake 22 formed in XI is a solid silicate residue containing substantially all the impurities to be eliminated from the zinc sulfate solution to be submitted to electrolysis, in particular iron, antimony, arsenic, aluminum, tin and geranium which are generally present in a zinc ore.

Figure 2:
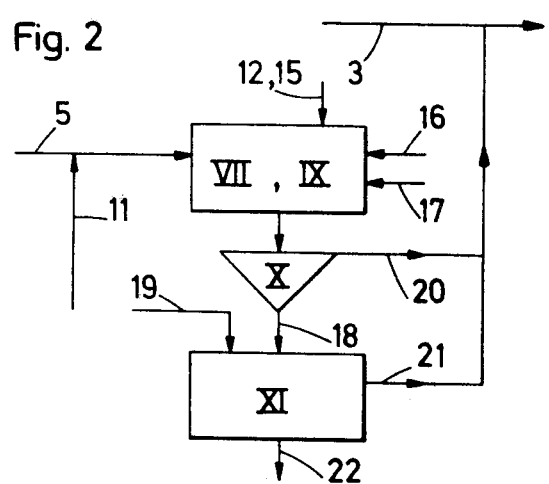
FIG. 2 is a block diagram of a variation of the embodiment of the process according to the invention illustrated by FIG. 1.

FIG. 2 relates to a variation of the embodiment illustrated by FIG. 1, which is different from the latter in that the hereinabove described attack occurring in IX takes place without prior separation of the residue coming from a neutralization carried out in VII. In this variation, one advantageously uses in the above steps VII and IX, a sufficiently basic alkaline earth metal silicate, preferably calcium silicate, as a slag, or a silicated zinc ore, optionally completed with slag, zinc oxide, limestone and/or lime, so as to precipitate impurities, forming a solid silicate residue which is then separated in the same way as in the embodiment illustrated by FIG. 1.

Another variation according to the invention, when performing the precipitation of the impurities in two steps, consists firstly in adding to the solution, the silicate of an alkaline earth metal, more particularly in the form of a slag, at a pH between 0.5 and 1.5 so as to form dissolved silicic acid, and secondly in adding a neutralizing agent in the form of limestone or lime to bring up and maintain the pH of the solution between 3.5 and 4.5, forming a solid silicate residue mainly made up of iron silicate. The process of this invention permits also the removal of Mg by precipitation as a fluorinated compound. Normally, these compounds are considered as unfiltrable.

In the scope of the process described herein, the fluoride of Mg is adsorbed by the silicates, which confers a good filtrability. The fluorine-containing compound is preferably a mixture of fluorhydric acids and fluorosilic acids, a by-product in the manufacture of phosphoric acid, but other fluorinated compounds can also be used. The addition of the fluorinated compound can be made on the whole treated volume or on a fraction thereof.

EXAMPLE 1

300 ml of a lixiviation solution containing 10 gr/l of Fe, 150 gr/l of Zn and 5.4 gr/l of Mg were added together with 29 gr of slag to a reactor containing 100 ml of the same lixiviation solution but without iron. The addition of reactants was regulated so as to obtain a pH $\geq 5$ during the reaction. The reaction mixture at 70°–80° C. was stirred with a helix.

The warm mixture was filtered under vacuum. The filtrate composition was as follows: 149.8 gr/l of Zn; 7 gr/l of Mg; 0.05 gr/l of Al; 0.7 gr/l of Fe.

EXAMPLE 2

300 ml of a lixiviation solution containing 10 gr of Fe, 150 gr of Zn, 8.4 gr of Mg and a trace of Cu were added together with 26 gr of slag to a reactor containing 100 ml of the same lixiviation solution as Example 1 but lacking iron.

The addition of reactants was regulated so as to maintain a pH $\geq 1.5$ during the reaction. The mixture was maintained in an oxidizing condition by air injection. The whole was stirred at a temperature of 70°–80° C.

The warm mixture was filtered under vacuum. The filtrate composition was as follows: 149.8 gr/l of Zn; 9.1 gr/l of Mg and 0.1 gr/l of Al.

EXAMPLE 3

300 ml of a lixiviation solution containing 10 gr of Fe, 150 gr of Zn and 11.4 gr of Mg were added together with 28 gr of slag to a reactor containing 100 ml of the same lixiviation solution as Example 1 but lacking iron. The addition of reactants was regulated so as to maintain a pH $\geq 1.5$ during the reaction. A small amount of organic or inorganic oxidizing agent was added and the reaction medium at 70°–80° C. was stirred with a helix.

The warm mixture was filtered under vacuum. The filtrate composition was as follows: 149.8 gr/l of Zn; 12.4 gr/l of Mg and 0.2 gr/l of Al.

EXAMPLE 4

1.000 ml of a solution containing 63 g of Zn, 33 g of Fe, 6.1 g of Mg, 1.42 g of Na and 3 g of $H_2SO_4$, were added to a reactor together with 44.5 g of slag. The reactor was maintained at 90° C. for 2 hours. At the end of the reaction, the pH was 1.4. During a second step, the mixture obtained during the first step was introduced to a reactor simultaneously with a basic mixture consisting of basic zinc sulfate in such a way to maintain the pH at 4. The addition was carried out over 1 hour in a reactor maintained at 90° C. The hot mixture was filtered under vacuum. The composition of the filtrate was as follows: Zn, 72 g; Fe, 0.2 g; Mg, 8.9 g.

EXAMPLE 5

300 ml of a solution containing 82 g of Zn, 19.2 g of Mg, 21.3 g of Fe and 30 g of $H_2SO_4$ were added to a reactor together with 9 g of slag. The reactor was maintained at 90° C. for 2 hours. At the end of the reaction, the pH was 1.4. A quarter of the suspension obtained after the first step was neutralized with 27 g of $CaCO_3$ and 25 ml of a solution of fluorosilicic acid containing 20% fluorine by weight were added thereto. This suspension was introduced within 1 hour to the three quarters of the suspension obtained during the first step by maintaining the pH=4. The hot mixture was filtered under vacuum; the composition of the filtrate was as follows: 85 g of Zn, 17.4 g of Mg, 0.2 g of Fe.

EXAMPLE 6

300 ml of a solution containing 82 g of Zn, 19.2 g of Mg, 21.3 g of Fe and 30 g of $H_2SO_4$ were added to a reactor together with 9 g of slag. The reactor was maintained at 90° C. for 2 hours. At the end of the reaction, the pH was 1.4. During the second step, a suspension of 27 g of $CaCO_3$, 25 ml of a solution of fluorosilicic acid containing 20% fluorine by weight and the suspension obtained during the first step were added together. At the end of the reaction, the pH was 3.9. The hot mixture was filtered under vacuum; the composition of the filtrate was as follows: Zn, 87 g/l; Mg, 18 g/l; Fe, 0.2 g/l.

From the foregoing Examples, it is seen that in accordance with the process of this invention, substantially all of the iron, divalent and/or trivalent, is removed from the zinc sulfate and that the magnesium concentration is maintained below a predetermined level.

An example of the process according to the invention herein carried out continuously and on an industrial scale is illustrated in the combined block flow diagrams of FIGS. 1 and 2.

19.5 metrical tons/hour of roasted zinc ore were contacted in I with 79 cubic meters/hour of return acid 2 having a concentration of 176 gr/l of $H_2SO_4$. The composition of the zinc ore was as follows:

| Zn | Fe | Pb | Al$_2$O$_3$ |
|---|---|---|---|
| 60% | 9% | 1.77% | 0.249% |

The thickened residue in II containing zinc ferrites at a concentration of 400 gr/l of solids was submitted in III to a hot acid attack at a temperature in the range of 90° C. to 95° C. with recycled acid 10 forming the main portion of the filtrate coming from the filtration operation in VI, and with a return acid introduction 2, so as to obtain in III a mean acidity of about 30 gr/l. The thickened residue 6 deprived of a portion of ferrites was retreated in V with a more acidic solution at a rate of 100 to 500 gr/l, formed by return acid 2 and an introduction 7 of about 98% concentrated fresh sulfuric acid.

The residue 9 resulting from this attack was substantially deprived of the whole zinc but contained the whole lead and the noble metals which are optionally present in the treated ores.

The other portion 11 of the filtrate, diluted with wash water 8, is added to overflow 5 so as to obtain an acid solution containing about 30 to 40 gr/l of $H_2SO_4$.

This solution which contains, in addition to zinc, a high concentration of dissolved iron impurities and of other undesirable metals of electrolysis, was then submitted to treatment according to the invention for the precipitation thereof while maintaining substantially the whole zinc in solution. According to the second variant illustrated by FIG. 2, calcium silicate is added at 12 and 15 to the solution while taking care to bring up and maintain the pH between 1.5 and 4.5 by the addition of a basic substance such as lime. Optionally, an oxidizing agent 16 and oxidizing air 17 is injected into the solution to facilitate the evaporation of the solution, thus reducing the presence of dissolved $CaSO_4$.

The precipitation reaction of $Fe^{+++}$ is very fast and is substantially complete after 1 hour. It is, however, advantageous to extend the reaction period in IX up to about 4 hours in order to oxidize $Fe^{++}$ susceptible to issue, for example, from the presence of sulfur in the ore and the slag. In practice, oxidation of $Fe^{++}$ to $Fe^{+++}$ is a relatively slow phenomenon. Care must be taken at the end of the iron precipitation that the pH of the obtained solution is close to that of the solution coming from the neutral lixiviation in I, so that the solution is directly usable in the purification to which it must be subjected before electrolysis.

The relatively low acidity, e.g., a pH of about 3 to 4, of the solution to be filtered in XI allows the use of less expensive materials than those employed in known purification processes. The efficiency of zinc extraction is about 99.5%.

It has been found that the silicate residue so obtained is readily filterable and permits an intensive counter-current washing to be carried out. The residue is a very stable and non-toxic product and possesses such properties as to be useful as embankment, as aggregate in cements and as starting material for manufacturing building blocks. The silicate residue finds particular application in the cement field due to the fact that it contains iron permitting convenient handling on an industrial scale. Moreover, the presence in this product of gypsum resulting, for example, from the neutralization of the sulfuric acid solution with slag, of silica mainly issuing from slag but also capable of partially issuing from the treated solution, and of alumina, makes the use of this product particularly useful in the cement field as an additive to starting materials before introduction of the latter into the furnace or after passing through the latter. Thus the invention also includes the product formed by the dried or unfiltered cake resulting from the described process, and its application, in the production of cement and any other product capable of using the aforementioned constituents.

It has also been found from the results of laboratory tests that the magnesium concentration in the solution to be subject to zinc electrolysis may be decreased by means of coprecipitation with silicate derivatives and in particular with iron silicate. As already mentioned, the silicic acid concentration in the medium is always very low and is substantially constant during the whole precipitation step. Due to the high reactivity of silicates of alkaline earth metals, in particular, slag, it is unnecessary to operate the reaction by varying the pH conditions and thus to work in a batchwise manner. The silicic acid produced is immediately precipitated by iron, carrying along other undesirable metals such as magnesium to the subsequent electrolysis.

The first neutralization step providing a pH of about 1.5 may advantageously be carried out with an oxidized or silicated zinc ore, which thus still increases the interest of the process. If zinc oxide is used, the quality of the final silicate residue is moreover considerably reduced. In addition, the introduction of zinc silicate in this first step is a very practical means for extracting zinc from ores which are treated only with difficulty by other processes. It has been found that as long as the pH of the solution does not exceed 1.5, the zinc silicate dissolution is fast and complete and the residue so formed is readily filterable. This is not generally the case in solutions of higher pH. As an example, at a pH of about 3, if the solution contains aluminum, the latter will tend to precipitate as a silico-alumina formed at the surface of zinc silicate particles thereby inhibiting the dissolution reaction of the latter. It has been thus found that it is not possible to use, on an industrial scale, a silicated zinc ore instead of a silicate of alkaline earth metals to cause the precipitation of metal impurities of solutions at a pH higher than 1.5 without substantially reducing the reaction rate and the zinc yield. This problem does not exist with slag having a high calcium silicate content due to the high reactivity of this silicate at a pH between 1.4 and 4.5.

The process of the invention herein is not limited to the purification of zinc sulfate solutions issuing from lixiviation of zinc ores or to the hereinabove described variants. Thus, many other hydrometallurgy applications are contemplated for precipitation of undesirable impurities as a silicate residue, optionally according to other variants of the process of the invention than those explicitly described hereinbefore. The acidity conditions in the precipitation of the silicate residue must, for example, be adapted to the nature of the impurities to be eliminated, to the type of metal to be extracted by electrolysis, and/or of the type of acid issued.

Some steps of the variants of the process herein, such as illustrated by FIGS. 1 and 2, can be divided into two or more stages. Thus, for example, the attack in IX can be accomplished in a first stage essentially to provide the formation of silicic acid by addition of basic substances, such as sufficiently basic silicates and the separation of the basic substance which is not completely attacked by this slag, and then, in a second stage, the addition of excess lime, for example, in an oxidizing medium in order to ensure maximum iron precipitation.

Among some advantages of the process according to the invention, with respect to some conventional steps preceding those of the invention, for example in the treatment of residues issuing from lixiviation of zinc ore, may be noted a realtively large purge of $SO_4$ ions, improving the sulfuric acid control in the whole process and allowing concentrated solutions to be obtained with the benefit of heat produced by concentrated acid in dilution and during the attack. As resulting from the preceding, the process according to the invention is more particularly useful for purification of solutions containing an amount of iron to be eliminated.

The invention herein is based on the discovery that iron plays an important role in the chemical and precipitation phenomenons occurring in the solution. Thus the precipitation mechanism is quite different in the elimination of silica from a silicated zinc ore, when dissolving the latter in a solution at a pH lower than 1.5 and then precipitating the dissolved silica by bringing the pH of this solution up to a value higher than 1.5 and by maintaining a relatively high temperature. In this case, silica solidifies by polymerization, while in the process according to the invention, formation of iron silicate is more particularly contemplated, which does not suppose a high temperature. It is important to note that it has been unexpectedly found that when the magnesium content in the solution to be purified exceeds a certain limit, a portion of this magnesium is coprecipitated with the iron silicate formed. In such manner, presence of magnesium in the lime employed in bringing the pH above 1.5 does not present any specific drawback.

Advantageously, according to the invention, in some cases it is advantageous to add an amount of iron ions to the aforementioned solution after the pH of the latter has been brought above 1.5, if for example the silicate or magnesium content of the ore is relatively high, in order to form a sufficient amount of iron silicate which is necessary to obtain a readily filterable and washable residue and a sufficient coprecipitation of other impurities existing in the solution. The amount of iron added is preferably substantially stoichiometrical with respect to the silica which is dissolved or capable of being dissolved in the solution.

What is claimed is:

1. A process of hydrometallurgical treatment for removing $Fe^{+++}$ ions from zinc sulfate solution, which comprises adding, in a first step, to said solution a silicate capable of forming dissolved silicic acid in situ at a pH between 0.5 and 1.5 and, in a second step, a neutralizing base to provide a pH between 3.5 and 4.5, forming a solid silicate residue mainly made up of iron silicate.

2. The process of claim 1 wherein the solution is a zinc sulfate solution containing metal impurities issuing from the acid attack of ferriferous residues, which comprises adding, in the first step, to said solution a silicate capable of forming dissolved silicic acid in situ at a pH between 0.5 and 1.5 and, in a second step, a neutralizing base to provide a pH between 3.5 and 4.5, forming a solid silicate residue mainly made up of iron silicate.

3. The process of claim 2 wherein a silicated zinc ore is added in the first step.

4. The process of claim 1 wherein the neutralizing base is selected from the group consisting of lime or limestone.

5. The process of claim 1 wherein the silicate is an alkaline earth metal silicate.

6. The process of claim 1 wherein the alkaline earth silicate is calcium silicate.

7. The process of claim 1 wherein the alkaline earth metal silicate is slag.

8. The process of claim 1 wherein iron is precipitated in the presence of an oxidizing medium.

9. The process of claim 1 wherein the precipitation of iron is made at a temperature between 40° C. and 85° C.

10. The process of claim 1 which comprises adding to the solution a fluorinated compound, so as to form a precipitate of fluoride absorbed on the precipitated impurities.

11. The process of claim 1 which comprises adding to the solution a mixture of fluorhydric acids and fluorosilicic acids as the fluorinated compound.

12. The process of claim 1 which comprises adding to the solution fluorosilicic acid containing about 20% fluorine by weight as the fluorinated compound.

* * * * *